United States Patent [19]

Dubbe et al.

[11] 4,027,141
[45] May 31, 1977

[54] APPARATUS FOR ENCODING A MAGNETIC LABEL

[75] Inventors: Richard F. Dubbe, St. Paul, Minn.; Richard D. Ebbinga, Camarillo, Calif.

[73] Assignee: Minnesota Mining and Manufacturing Company, St. Paul, Minn.

[22] Filed: Sept. 8, 1975

[21] Appl. No.: 611,236

[52] U.S. Cl. .......................... 235/61.7 R; 101/92; 156/351; 235/61.11 D; 360/53
[51] Int. Cl.² ..................... G06K 7/08; G11B 5/09; B41L 47/46
[58] Field of Search ............. 360/2, 6, 53, 4; 235/61.11 D, 61.11 E, 61.7 R, 61.9 R, 61.9 A, 61.1, 61.6 R; 101/DIG. 18, 93.04, 92; 156/351

[56] References Cited

UNITED STATES PATENTS

| | | | |
|---|---|---|---|
| 2,113,620 | 4/1938 | Johnson | 235/61.7 R |
| 3,356,021 | 12/1967 | May | 101/92 |
| 3,359,548 | 12/1967 | Yoshii | 360/53 |
| 3,542,287 | 11/1970 | Schena | 235/61.7 R |
| 3,548,161 | 12/1970 | Schwarz | 235/61.6 R |
| 3,663,800 | 5/1972 | Myer | 235/61.11 E |
| 3,822,375 | 7/1974 | Ozeki | 235/61.9 R |
| 3,891,492 | 6/1975 | Watson | 156/351 |
| 3,958,270 | 5/1976 | Graniere | 360/4 |

*Primary Examiner*—Robert M. Kilgore
*Attorney, Agent, or Firm*—Cruzan Alexander; Donald M. Sell; William B. Barte

[57] ABSTRACT

An apparatus for encoding a magnetic recording medium in the form of discrete labels such as may be removably adhered to a carrier web includes a mechanism for transporting the medium past a magnetic record and playback head. As the tape passes the playback head, the data previously recorded thereon by the record head is played back and verified. If the playback signal is not verified, the label associated therewith is marked, such as by punching a section from the label, and is thereafter differently processed. In another embodiment, the apparatus includes a means for removing encoded labels from the carrier web and automatically positioned the removed labels at a dispensing slot. Alternatively, the encoded labels, either verified or not-verified (or both) may be rewound onto the carrier web.

17 Claims, 9 Drawing Figures

APPARATUS FOR ENCODING A MAGNETIC LABEL

CROSS REFERENCE TO RELATED APPLICATION

This application is related to a co-pending application by J. K. Knudsen, attorney's file no. FN 29,467, entitled MAGNETIC IDENTIFICATION LABEL TAPE, which application was filed on the same day herewith.

BACKGROUND OF THE INVENTION

1. FIELD OF THE INVENTION

This invention relates to apparatus for recording onto a magnetic recording medium and for playing back the record so as to verify the recorded signal to enable different processing of media containing verified and non-verified records. This invention also relates to apparatus for dispensing labels such as may contain a magnetic recording.

2. DESCRIPTION OF THE PRIOR ART

Magnetic recording apparatus including a transport mechanism, a recording head for magnetically encoding a magnetic recording medium transported by the mechanism past the head, a playback head positioned to scan the magnetic record medium after it has been encoded, i.e., trailing the record head, and logic circuits for verifying the encoded record are previously known. One such apparatus is designed for use with a magnetic disk-pack and enables a limited number of defects on a disk-pack to be located such that no signals are thereafter recorded at those locations.

In other magnetic recording apparatus such as instrumentation recorders, a playback head may be enabled during the recording process to verify the compliance of the recorded signal with certain prerequisites such as frequency response, harmonic distortion, signal-to-noise ratio, bias cross feed, cross talk and the like. In such recorders, if the recorded signal fails to meet the desired levels, the recording parameters are then readjusted. In all such systems, the purpose of the verification operation is to enable the apparatus to cope with various types of defects, be they in the magnetic media itself or in the quality of the incoming data signals.

Inasmuch as another aspect of the present invention is also directed to dispensing magnetically encoded labels, prior art relating to dispensing apparatus is also believed relevant. For example, apparatus for automatically dispensing tickets (in some respects at least analogous to labels) are known to be used in systems for controlling access to parking lots and ramps. In a typical such system, one driving across a pressure switch at the entrance to the facility causes a ticket to be time-stamped and presented at a dispenser slot. Removal of the ticket automatically causes another ticket to be advanced. Such systems are not known to utilize labels including a magnetic recording material nor to provide any capability of recording thereon.

SUMMARY OF THE INVENTION

In one embodiment, the present invention is directed to an apparatus for encoding, reading and verifying a magnetic recording medium, portions of which are to be affixed as labels to articles for the subsequent identification thereof. The recording medium is preferably in the form of discrete labels supplied with a pressure sensitive adhesive on one surface and removeably adhered to a carrier web such that upon removal from the carrier web they may be applied to articles such as vehicle tires prior to vulcanization. The magnetic encoding then enables magnetic identification of the articles subsequent to such vulcanization operations. The medium may likewise be in the form of a continuous magnetic tape which is cut off just prior to being dispensed from the apparatus to form a discrete label. Similarly, labels containing the magnetic recording media may be loaded in the apparatus in deck form and individually transported therethrough.

The apparatus of the present invention includes a mechanism for transporting the medium adjacent a magnetic recording head. As a portion of the medium thus passes by the recording head, the head is energized with a signal corresponding to unique information relating to the article to which the label will ultimately be attached to thereby magnetically encode that portion with such information. A magnetic playback head is also provided for reading the magnetic encoding and for producing a signal corresponding thereto. A circuit coupled to the playback head verifies the encoding and produces an enabling signal indicative of the verification such that an additional mechanism is energized to automatically differently process that portion in response to the enabling signal.

In a preferred embodiment, the signal produced by the playback head is compared with a signal indicative of a desired signal such that if a requisit degree of correspondence is present, the enabling signal is produced. Similarly, the enabling signal may correspond to the lack of a requisite degree of correspondence.

The mechanism for automatically differently processing the labels preferably includes means for marking selected labels or portions of the recording medium corresponding to a given label and for differently dispensing the marked labels or portions. One such mechanism punches a notch in the selected label such that the punched lables may be optically sensed and differently processed.

In another embodiment, the apparatus of the present invention includes means for magnetically encoding a portion of the magnetic recording medium as it is transported past the magnetic recording head, means for automatically positioning the encoded medium in the form of a first label at a dispensing slot and for automatically positioning another encoded medium in the form of another label at the slot upon the removal of the first label therefrom. In a preferred embodiment for use with magnetic recording medium in the form of discrete labels removeably adhered to a carrier web, the apparatus further comprises means for removing the labels from the carrier web prior to positioning them at the dispensing slot.

DESCRIPTION OF THE PREFERRED EMBODIMENTS

Apparatus constructed in accordance with a preferred embodiment of the present invention is particularly suited for encoding magnetic labels releasably carried on a carrier web. A preferred construction of such a tape and labels is discussed and claimed in the co-pending application by J. K. Knudsen, which application was filed on the same day herewith.

Figure 1:
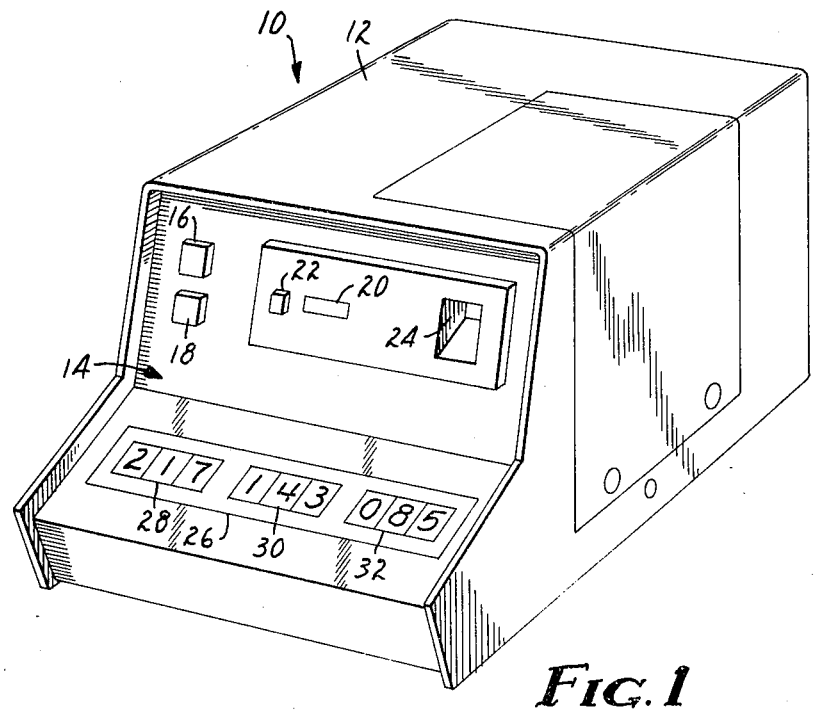
FIG. 1 is an exterior perspective view of the apparatus of the present invention.

The perspective view of such a preferred apparatus shown in FIG. 1 reveals that the apparatus 10 includes an outer housing 12 and a front control panel shown generally as 14. Positioned on the control panel 14 is a power control switch 16, a failure light 18, a tag counter 20 and reset button 22 therefor, a dispensing slot 24 and input switches shown generally as 26. The input switches are separated to provide inputs indicative of three types of input information. The three thumbwheel swtiches 28 provide an input indicative of a specific machine, the three thumbwheel switches 30 provide information indicative of the machine operator and the three thumbwheel switches 32 provide information as to the date on which the respective labels were encoded.

Figure 2:
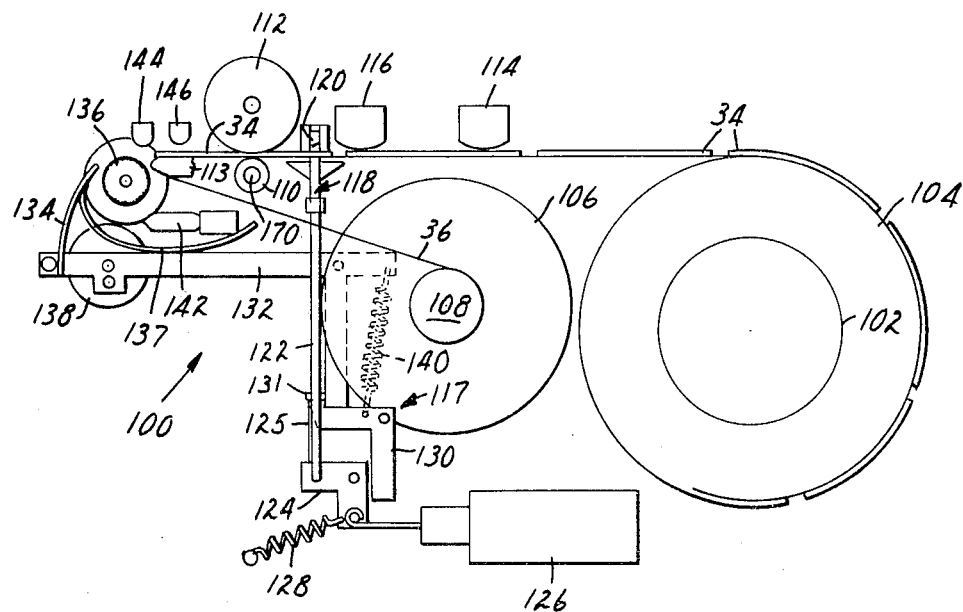
FIG. 2 is an exploded side view of the label transporting and automatic processing mechanism utilized in a preferred embodiment of the present invention.

The exploded side view of the label transporting and automatic processing mechanism shown in FIG. 2 presents a clear illustration of the manner in which labels 34 are selectively removed from a carrier web 36 and differently processed as a result of a verification of the magnetic encoding.

As shown in FIG. 2, the mechanism 100 for transporting the labels and carrier web includes a hub 102 for supporting a supply roll 104 of a tape including labels adhered to a carrier web. A take-up reel 106 also supported on a hub 108 is provided for rewinding the carrier web 36. The tape, including the labels and carrier web, is controllably driven through the apparatus by a capstan 110 and opposing pressure roller 112. The carrier web 36 is peeled from the labels 34 by passing over a peel-off member 113 prior to being rewound on the take-up reel 106. The assembly for driving the capstan 110 is shown in more detail in FIGS. 3 and 4. Provided along the transport path is a magnetic recording head 114 and a magnetic playback head 116. As a label is transported past the recording head 114, signals indicative of information associated with the article to which the label is ultimately to be applied to the recording head 114 so as to magnetically encode the label 34. As the label 34 then passes by the playback head 116, a signal corresponding to the encoded information is reproduced. The reproduced signal is verified in the manner set forth in detail hereinafter and utilized to produce an enabling signal. In the embodiment shown in FIG. 2, the absence of an enabling signal activates a mechanical marking assembly 118. This assembly 118 includes a reject punch 120 having a cut-off section such that when an edge of the tape is placed in the cut-out and the punch 120 is moved downward, a semicircular notched section is removed from the tape. The punch 120 is coupled to a link rod 122 and thence through a bell crank 124 to a solenoid 126. Upon activation of the solenoid 126 the bell crank 124 drives the link rod 122 and punch 118 coupled thereto downward, thereby punching the section out of the edge of a label. The bell crank 124 is biased in an upward position by means of the spring 128.

The bell crank 124 is also coupled via a link rod 125 to a reject arm latch 131. The pivoting of the bell crank 124 causes the rod 125 to pull down the latch 131, thereby allowing the pivotably supported reject arm 132 and associated members mounted thereon to move upward due to the action of spring 140. The upward motion of the arm 132 causes a guide 134 mounted thereon to intercept the normal path of the labels 34, causing them to contact a knurled roller 136 driven via an O-ring (not shown) from the capstan shaft 170. The roller 136 carries the labels thus contacted around is periphery so as to recontact the carrier web 36. Also supported adjacent the knurled roller 136 is a tag guide 137 which assists in guiding tags around the roller 136 and back onto the carrier web 36 after the carrier has passed by the peel-off member 113. The arm 132 also carries an eccentrically mounted toothed wheel 138 which is brought into contact with the O-ring driving the knurled roller 136 when the arm 132 is pivoted upward. This causes the wheel 138 to be driven through a revolution such that upon de-energization of the solenoid 126, the arm 132 is forced downward so as to re-engage with the latch 131 on the bell crank 130.

Also shown in FIG. 2 is a light source 142 positioned below the path taken by the labels 34, and photocells 144 and 146 positioned above the path traversed by the labels 34. Light from the light source 142 is alternately blocked from the photocells 144 and 146 by the presence of labels or is allowed to pass through the space between adjacent labels or through the section removed from a given label as a result of the action of the punch member 118 and activate the photocells.

Figure 3:
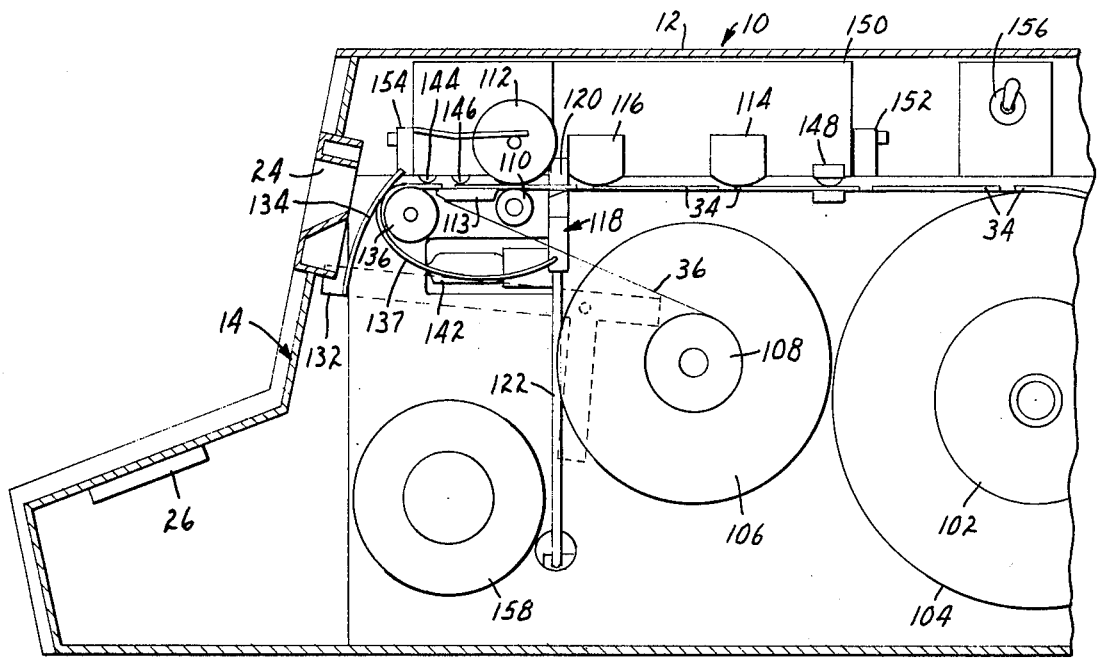
FIGS. 3 and 4 are partial left and right side views respectively of one embodiment of the present invention.
Figure 4:
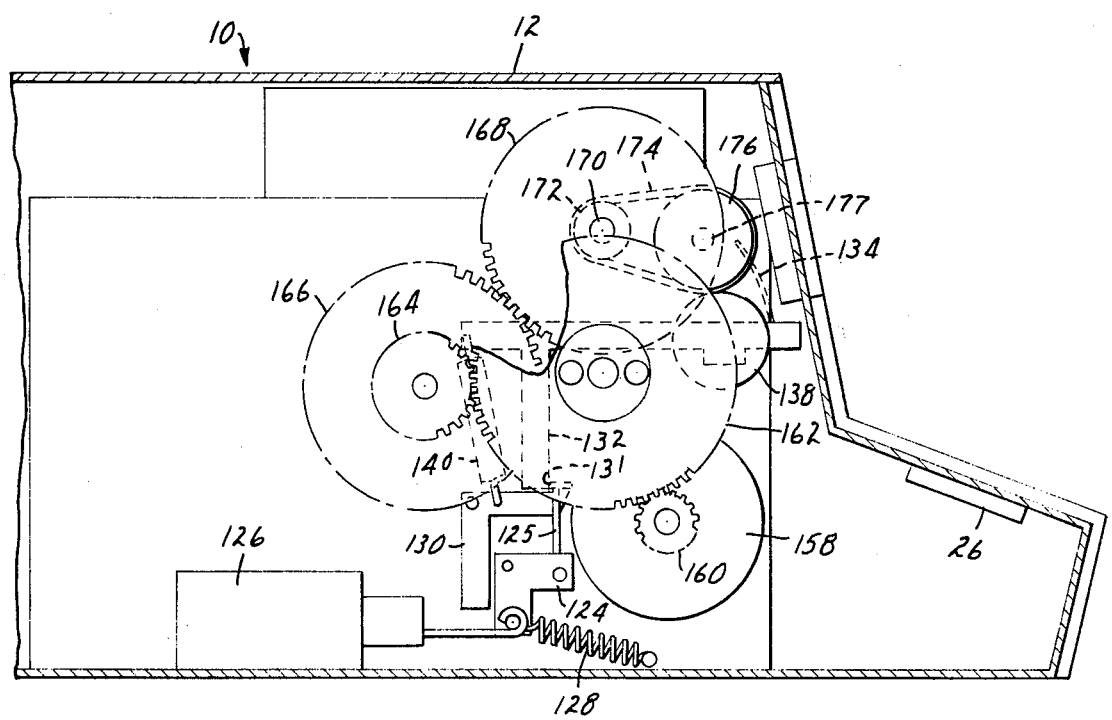

FIGS. 3 and 4 are partial side views of the apparatus 10 shown in FIG. 1, and show additional details of the transporting, verification, and dispensing mechanisms. In FIG. 3, the tape including the labels 34 and carrier web 36 is shown to be threaded along a transport path between the supply spool 104 and the take-up reel 106. Sequentially positioned along the path are a guide 148, the recording and playback heads 114 and 116 respectively, already discussed in conjunction with FIG. 2, and the dispensing slot 24. The heads 114 and 116, the pressure roller 112 and the photocells 144 and 146 (not shown in FIG. 3) are all mounted on an assembly 150 which is pivotably mounted on supports 152 and 154, in order to facilitate threading the tape along the transport path. In FIG. 3, the arm 132 is shown to be pivoted upward such that the guide arm 134 is in the transport path to intercept tags 34 and to thereby guide them around the knurled roller 136. Also positioned above the transport path is a mode selection switch 156.

The opposite side of the apparatus 10 shown in FIG. 4 enables the transport driving mechanism to be clearly seen. As is there presented, a motor 158, suitable energized via a motor control network to be discussed hereinbelow, is coupled via gears 160, 162, 164, 166 and 168 to the shaft 170 on which the capstan 110 is secured. Also mounted on the shaft 170 is a pulley 172 which drives, via an O-ring 174, a pulley 176 mounted on the shaft 177. The knurled wheel 136 is also mounted on the shaft 177. When the arm 132 is pivoted in response to the energization of the solenoid 126, the eccentrically mounted wheel 138 is moved upward into contact with the O-ring 174. As the knurled wheel 138 rotates, the arm 132 is forced downward until it is re-energized by the latch on the bell crank 130.

Figure 5:
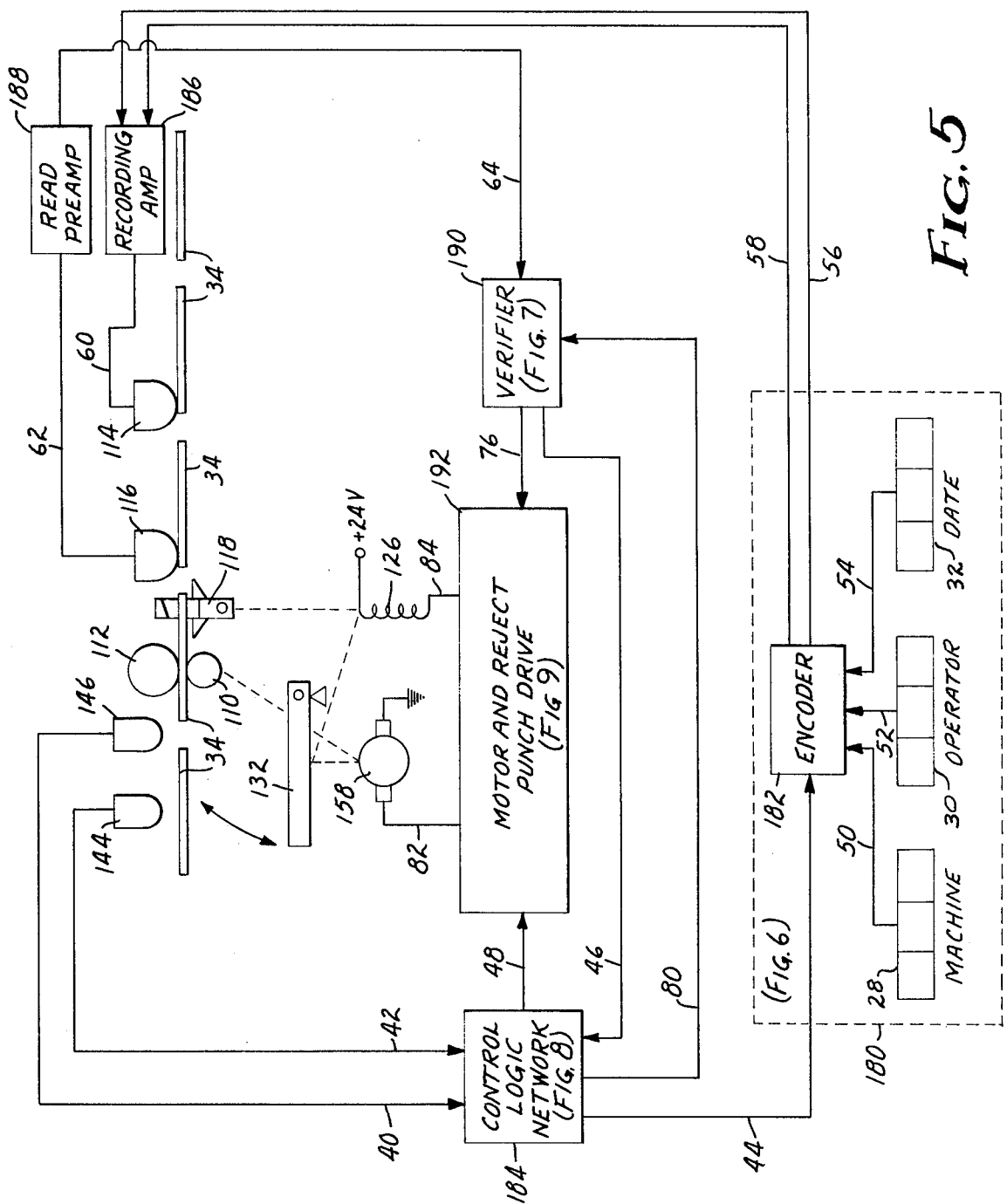
FIG. 5 is a block diagram of the electrical and mechanical features of the present invention.

The electrical and mechanical features of a preferred embodiment of the present invention whereby magnetic labels may be encoded and verified are set forth in a block diagram in FIG. 5. In that figure, an input encoding network 180 may be seen to include the input switches 28, 30 and 32 and an encoder 182. The three thumbwheel switches 28 may be set to provide a binary coded decimal input signal on lead 50 indicative of a specific machine. The three thumbwheel switches shown generally as 30 provide a similar binary coded decimal input signal on lead 52 indicative of a specific machine operator. Similarly, the three thumbwheel switches 32 provide a binary coded decimal input signal on lead 54 indicative of the date on which respective labels were encoded. The inputs from all of the thumbwheel switches are coupled to the encoder 182. Also shown as an input to the encoder 182 is a "scribe" signal from a control logic network 184 on lead 44. Output signals from the encoder 182 on leads 56 and 58 are coupled to a recording amplifier 186 and thence via lead 60 to the magnetic recording head 114. The details of the encoder 180 and the recording amplifier 186 are set forth in FIG. 6 and the discussion relating thereto.

The output from the magnetic playback head 116 is coupled via lead 62 to a read preamplifier 188 and thence via lead 64 to a verifier 190. The "scribe" signal on lead 80 from the control logic network 184 is also provided as an additional input to the verifier 190. Outputs from the verifier 190 are provided to the motor and reject punch drive 192 on lead 76 and to the control logic network 184 on lead 46. The details of the verifier 190 and the read preamplifier 188 are set forth in FIG. 7 and the discussion relating thereto.

The control logic network 184 is responsive to signals from the photocells 144 and 146 (see FIG. 2) on leads 40 and 42 respectively, and, in addition to the "scribe" signal on leads 44 and 80, provides a control signal to the motor and reject punch drive 192 on lead 48. The details of the network 184 are set forth in FIG. 8 and in the discussion relating thereto.

The motor and reject punch drive 192 is responsive to control signals on leads 48 and 76 and appropriately energizes the motor 158, thereby activating the arm 132 and capstan 110 to controllably transport the labels 34 and supporting carrier (not shown) in different directions depending upon the presence of an enable signal. These control signals also selectively energize the solenoid 126 to thereby activate the punch 118. The details of the drive 192 are set forth in FIG. 9 and in the discussion relating thereto.

Figure 6:
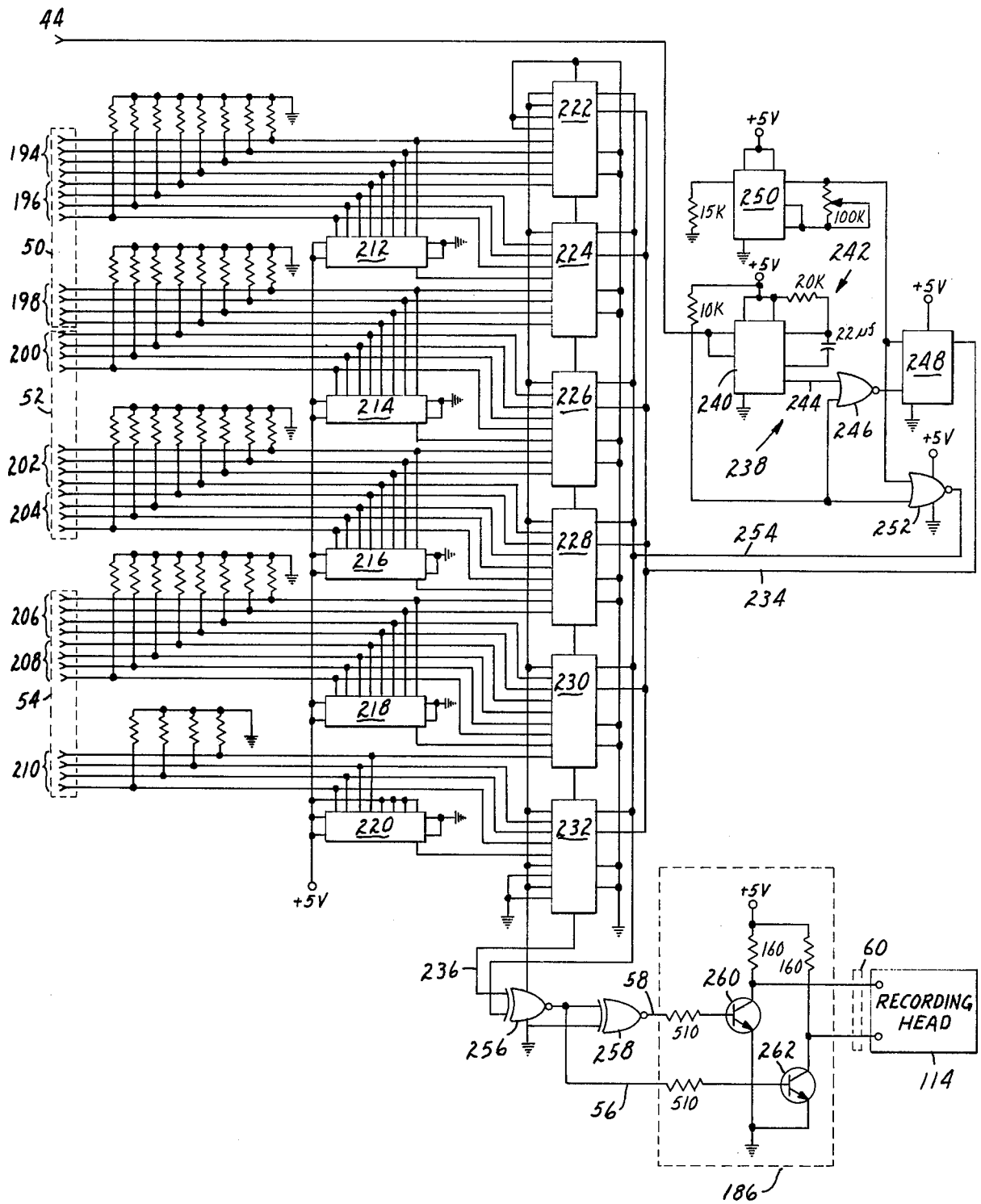
FIG. 6 is a detailed schematic showing the encoder, rec. amplifier and rec. head as shown in FIG. 5.

The encoder 182 shown in detail in FIG. 6 receives the inputs from the thumbwheel switches 28, 30 and 32, respectively, on leads shown cummulatively as 50, 52 and 54 respectively. Each of the thumbwheel switches consists of three individual switches providing a binary coded decimal output signal corresponding to the numbers zero through nine. Each of these switches is coupled to a positive voltage source such as +5 volts so as to supply a +5 volt signal on the appropriate leads upon closing of the switch. Machine indicating data signals representative of the hundreds digit are thus received on the four terminals 194, signals indicative of the tens digit are received on the four terminals terminals 196 and signals indicative of the units digit are received on terminals 198. Similarly, the operator identity data signals representative of the hundreds, tens and units digits are coupled to like groups of four terminals 200, 202 and 204 respectively. In a like manner, the date indicating data signals indicative of the hundreds, tens and units digits are coupled to the three sets of four terminals 206, 208 and 210. Each of these terminals is coupled to appropriate terminals of the parity generators 212, 214, 216, 218 and 220 to appropriate terminals of the parallel load shift registers 222, 224, 226, 228, 230 and 232, respectively, in a conventional manner.

The output from each of the shift registers is coupled through the next register in line such that in response to a control signal on lead 234, time-sequenced signals corresponding to the parallel input binary coded decimal information are fed out from the last shift register 232 on lead 236. The control signal on lead 234 is produced by a control circuit 238. This circuit is triggered by the "scribe" signal of lead 44 from the control logic network 184, indicative of the presence of the leading edge of a label adjacent the recording head 114. The control circuit 238 includes a one-shot multivibrator 240 responsive to the signal on lead 44. The multivibrator 240 is provided with an RC time constant network 242 to provide a slight delay such that the labels are caused to move a short distance and to stabilize the speed with respect to the recording head 114 before the input data is presented. This delay corrsponds to a series of 20 zeros in the ultimate signal to be recorded. The output from the multivibrator 240 is coupled on lead 244 together with a signal on lead 44 through a NOR gate 246 to a D-type edge triggered flip-flop 248. The other input to the flip-flop 248 provides a clocking signal from timer 250 to thereby control the spacing of the data bits in the time-sequenced signal on lead 236. The output of the flip-flop 248 provides the control signal on lead 234 as discussed hereinabove. An additional NOR gate 252 is also driven by the output of the timer 250 and by the "scribe" signal on lead 44 to provide a clock signal on lead 254. The control signal on lead 234 and the clock signal on lead 254 are coupled to each of the shift registers 222, 224, 226, 228, 230 and 232. The clock signal on lead 254 is also coupled to an exclusive NOR gate 256 together with the output signal on lead 236. The control signal on lead 234 thus commands each of the shift registers to load or shift depending upon the presence of the signal. As the signal on lead 236 is held at zero as a result of the shift register being held at zero, the clock signal on lead 254 causes a train of twenty zeros to be coupled through exclusive NOR gate 256. The output of the exclusive NOR gate 256 is coupled on lead 56 as a positive driving signal to the recording amplifier 186. This driving signal is also coupled to a second exclusive NOR gate 258 to provide an inverted driving signal on lead 58.

The signals on leads 56 and 58 are amplified in the recording amplifier 186 comprising transistors 260 and 262 and associated resistors. The output of the recording amplifier 186 is coupled on lead 60 to the recording head 114.

A typical message thus presented to the recording head 114 to be encoded on a label includes the following succession of binary bits:

Approximately 20 zeros to ensure that the actual recorded information is encoded on a valid section of the label, a start word 0101, a parity bit, which may be a 1 or a 0 depending upon the inputs from the thumbwheel switches, 4 data bits corresponding to the last digit of the date information, a parity bit, 8 data bits corresponding to the second and third digits of the date information, a parity bit, 8 data bits corresponding to the first and second digits of the operator identity information, a parity bit, 8 data bits corresponding to the third digit of the operator identity information and the first digit of the machine identity information, a parity bit, 8 data bits corresponding to the second and third digits of the machine information, a close of message word, 001, and finally, an additional train of approximately 20 zeros.

Figure 7:
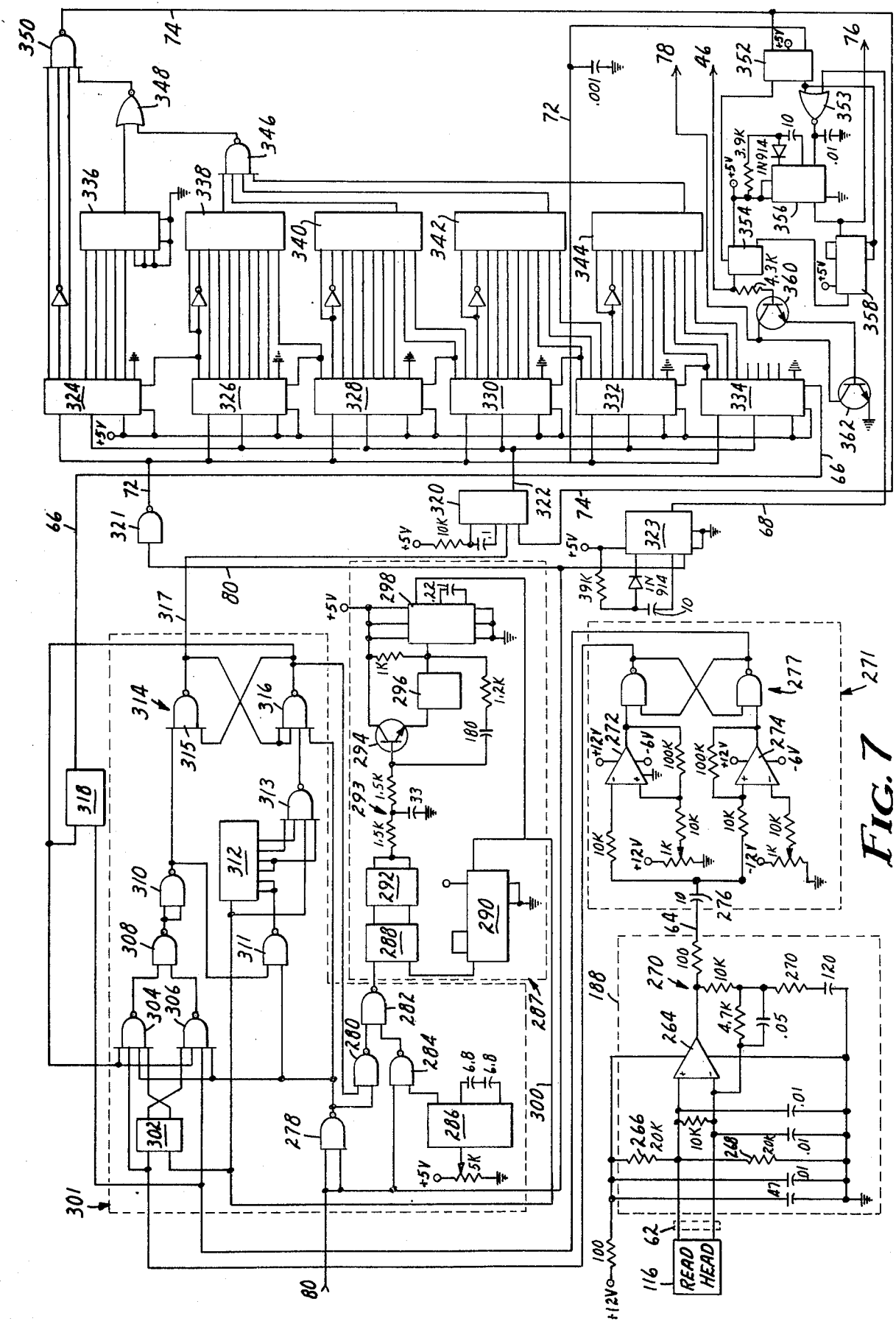
FIG. 7 is a detailed schematic view of the verifier network shown in FIG. 5.

FIG. 7 shows the details of the verifier 190 together with the read head 116 and the read preamplifier 188. This preamplifier includes a frequency compensated operational amplifier 264 to which both terminals of the read head 116 are coupled. The DC level of the read head 116 is fixed via a voltage divider network consisting of resistors 266 and 268. The gain and frequency response characteristics of the amplifier 264 is controlled by a feedback network 270.

The output of the read preamplifier 188 is coupled on lead 64 to the verifier 190 through a coupling capacitor 276, which fixes the DC level of the incoming signal at zero volts. The first stage 271 of the verifier 190 consists of high speed window comparators 272 and 274 and a flip-flop 277. The input of each comparator is coupled through a variable resistor to a source of either positive or negative potential. Depending upon the settings of these variable resistors, each comparator may be set so as to pass only signals which have an intensity above a predetermined noise level. Typically, these variable resistors are adjusted so as to provide an offset bias voltage of approximately ± 0.3 volts. The output of the comparators 272 and 274 are coupled to the flip-flop 277, consisting of a pair of NAND gates which provides an output therefrom only when the incoming signals are within the established voltage range.

The second stage of the verifier 190 comprises a phase locked feedback loop circuit 287 and a clock recovery circuit 301 to which the outputs of the flip-flop 277 are coupled. Also coupled as an input to this stage is the "scribe" signal on lead 80 from the control logic network 184, so as to activate the verification process only at the beginning of the passage of a label past the read head 116.

The feedback loop circuit 287 provides synthetic clock pulses synchronized to the incoming data from the incoming flip-flop 277, which clock pulses are used for decoding the data. The "scribe" signal is coupled through a NAND gate 278 and thence through an expanded exclusive OR gate consisting of NAND gates 280, 282 and 284. Inputs to the NAND gates are provided via the "scribe" signal on lead 80 and the output from a voltage controlled oscillator (VCO) 286 which provides a train of standby clock pulses. The output of the NAND gate 282 is coupled to a phase detector 288. Also provided as an input to the detector 288 is the output from a 4-bit binary counter 290, which is coupled to provide a "divide by 16" function. The outputs of the detector 288 are provided through a "charge pump" 292 and thence through a filter network 293 to a DC amplifier consisting of transistor 294 and the amplifier portion 296 of the integrated circuit frequency/phase detector which includes the detector 288 and "charge pump" 292. The DC signal corresponding to the phase error is sent to the VCO 298, which is fed back to the detector 288 through the binary counter 290.

The VCO output on lead 300, together with those provided from the flip-flop 277 are coupled to the clock recovery circuit 301. These signals are received by a D-type edge triggered flip-flop 302 and thence to an expanded exclusive OR gate consisting of NAND gates 304, 306 and 308. The output of the NAND gate 308 is coupled through an inverter 310 and NAND gate 311 to drive a "divide by 12" counter 312. The output of the "divide by 12" counter 312 is coupled to a NAND gate 313. The output of the gate 313, together with the output of the inverter 310, are coupled to a flip-flop 314 consisting of NAND gates 315 and 316. The output of the flip-flop 314 is coupled via a feedback path to the NAND gate 280 and also via a second feedback path to the NAND gate 304.

This feedback path is further coupled to a D-type edge triggered flip-flop 318, which together with an output from the flip-flop 277 provides an output signal on lead 66, which signal is indicative of non-return to zero data, i.e., true information data having the clock information removed therefrom. The flip-flop 314 also provides an output signal on lead 317 when the incoming data is in phase. This signal is coupled through a one-shot multivibrator 320. The outputs from the multivibrator 320 are provided on lead 322. The "scribe" signal on lead 80 is further coupled through a one-shot multivibrator 323 to provide a clock output signal on lead 68, and also through an inverter 321 to provide a clearing signal on lead 72.

The various signals on leads 66, 68, 72 and 322 are coupled to the third stage of the verifiers 190, which comprises a succession of 8-bit serial to parallel shift registers 324, 326, 328, 330, 332 and 334 and thence to parity check circuits 336, 338, 340, 342 and 344. The clearing signal on lead 72 clears the registers before new information is provided. The output of the parity check circuits are combined in the NAND gate 346, NOR gate 348 and NAND gate 350 to provide an output signal on lead 74 which is coupled back to the multivibrator 320. When parity is achieved, the output of multivibrator 320 is thus inhibited by the presence of the output signal on lead 74, thereby allowing the information to the registers to remain. When parity has not been achieved by the time the label is aligned with the scribe sensor 146 (FIG. 5), thereby causing a signal on lead 72, the signals on leads 72 and 74 will produce an output on flip-flop 352. This output is coupled through NOR gate 353 to the multivibrator 356 to provide an output signal on lead 76 to the 4-bit binary counter 358 and to the motor and reject punch drive 192. This output signal activates the punch and reject mechanism. A "stop command" signal is provided on lead 46 to the control logic network 184 from the flip-flop 354 to inhibit advancement of labels in the event proper parity has not been obtained for eight consecutive labels. This signal further drives a pair of transistors 360 and 362, the output of which on lead 78 energizes the failure light 18 (FIG. 1).

Figure 8:
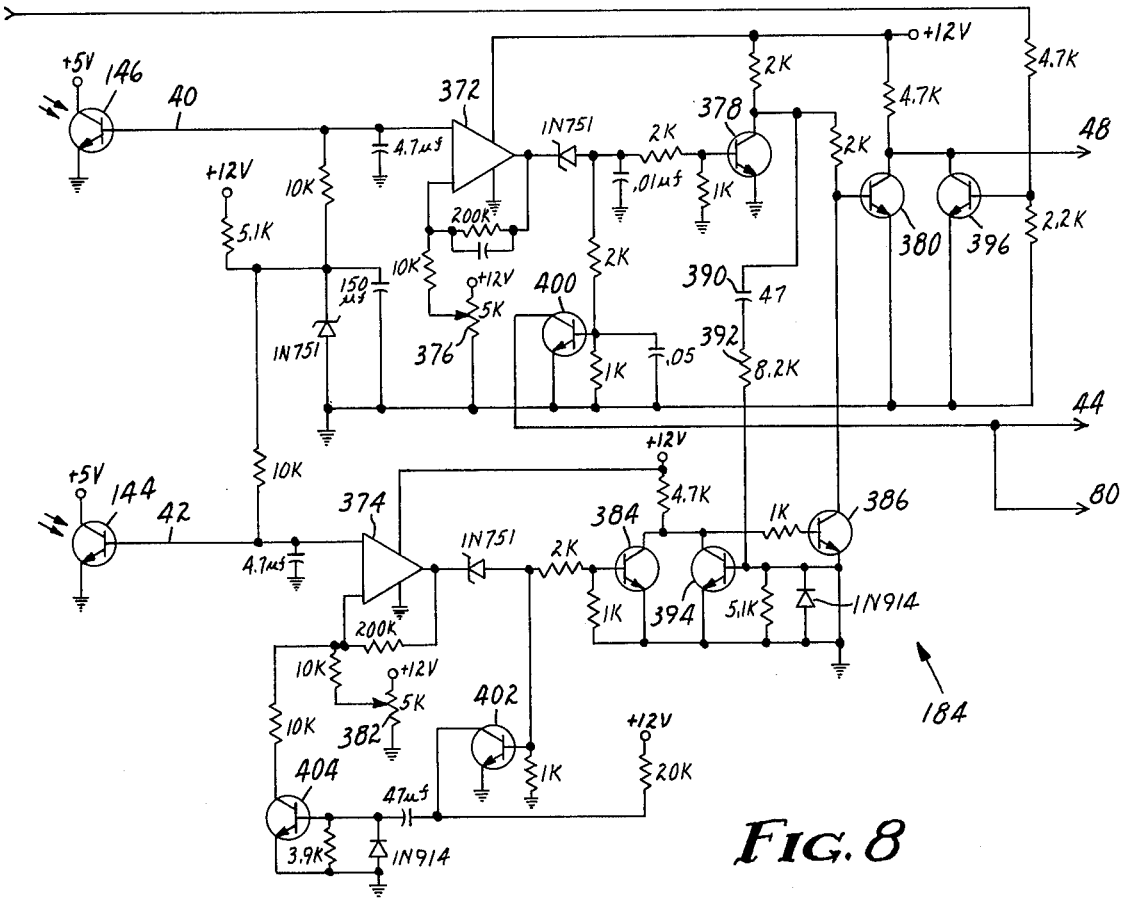
FIG. 8 is a detailed schematic view of the control logic network shown in FIG. 5.

The control logic network 184 shown in detail in FIG. 8 is activated by photo-transistors 146 and 148 via leads 40 and 42, and by the stop command signal on lead 46 from the verifier circuit 190. The signal from the "scribe" photo-transistor 146 is coupled to an operational amplifier 372. The bias level for amplifier 372 is established by a network including resistor 376 such that when the signal from the photo-transistor 146 exceeds the established bias level, a high voltage output is fed from the amplifier to transistor 378 and thence through transistor 380 to provide the control signal on lead 48. This control signal is coupled to the motor and reject punch drive 192 to thereby prevent further advancement of the labels. The input from the "tag" photo-transistor 144 is similarly coupled via lead 42 to a second operational amplifier 374. The bias level of this amplifier is established via the network including resistor 382 such that an output to transistor 384 is provided when the level from the photo-transistor 144 exceeds the established bias level. The output from the transistor 384 is coupled through transistor 386 and thence to transistor 380 to further inhibit the production of the control signal on lead 48 in the event that a tag is sensed at the output slot 24 (FIG. 1). In the event an invalid lable is present, the signal present at the output of transistor 378 is coupled through capacitor 390 and resistor 392 to provide a slight delay, stopping label movement while the punch mechanism operates. This signal is then coupled through transistor 394 to activate transistor 386. Further control over the production of the control signal on lead 48 is provided via the "stop command" signal on lead 46 from the verifier circuit 190. This signal is coupled to transistor 396 to thereby prevent the production of a signal on lead 48. The output of amplifier 372 is further coupled to transistor 400 to provide "scribe" signals on leads 44 and 80 which activate the encoding network 182 and verifier circuit 190. Amplifier 374 is provided with hysteresis by a feedback network including transistors 402 and 404; the output of the latter of which is coupled back to the input of the amplifier 374.

Figure 9:
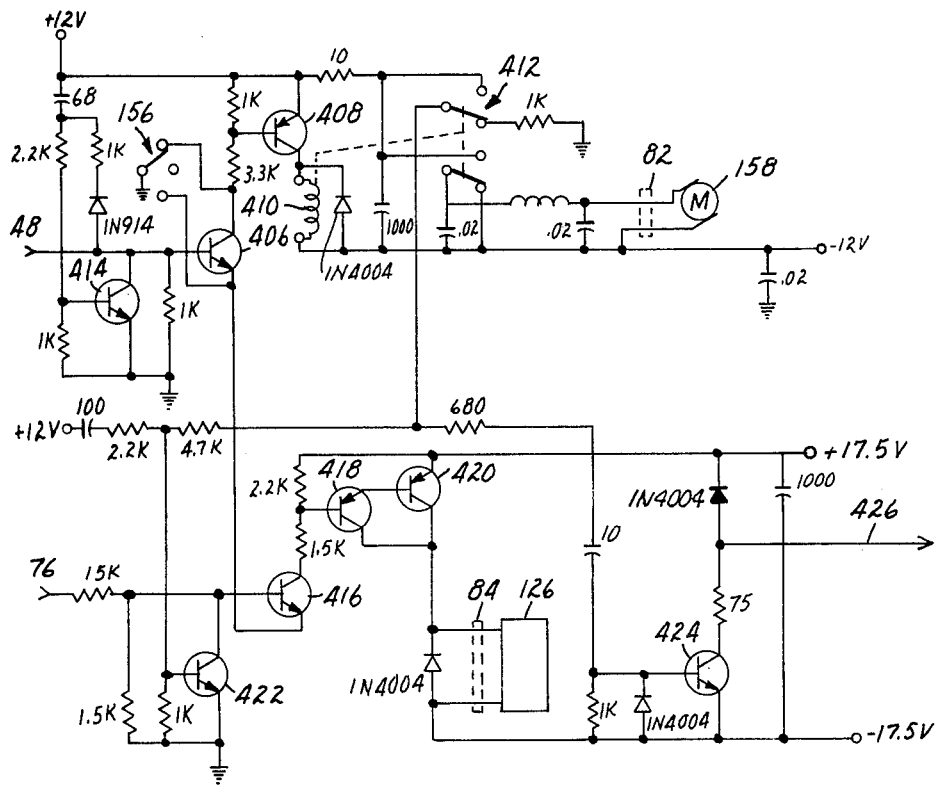
FIG. 9 is a detailed schematic view of the motor and reject punch drive circuitry shown in FIG. 5.

The motor and reject punch drive shown in FIG. 9 is activated via the control signal on lead 48 and a punch command signal on lead 76. The signal on lead 48 is coupled through transistor 406 and thence through transistor 408 to energize the relay 410, the contacts of which shown generally as 412 control the application of power via leads 82 to the motor 158. The energization of the relay 410 via the switching of transistor 408 is further controlled by a three-position switch 156 mounted on the interior of the apparatus 10 so as to enable tape to be advanced during threading operations. In the operate position, the switch 156 provides a ground to transistors 406 and 416, thereby enabling these transistors to respond to input signals on leads 48 and 76, respectively. In the advance position, a ground is provided to forward bias the transistor 408, thereby continuously energizing the motor 158. Turn on transients associated with transistor 406 are further controlled via transistor 414 and the associated time constant network associated therewith.

The punch control signal on lead 76 is coupled to transistor 416 and thence to transistor 408 and 420 to drive the solenoid 126 via lead 84. The activation rate of transistor 416 is controlled via transistor 422 and its associated time constant network. Transistor 422 is switched when motor 158 is energized to provide a signal on lead 426 to drive the tag counter 20 located on the front panel (see FIG. 1).

In the preferred embodiment disclosed hereinabove in conjunction with FIGS. 6–9, the following specific component types were selected, listed generally in order of the description thereof:

| NUMBER | GENERAL DESCRIPTION | TYPE |
|---|---|---|
| 212, 214, 216, 218, 220 | 8-bit odd/even parity generator/checker | Integrated Circuit (IC) type 74180 |
| 222, 224, 226, 228, 230, 232 | 8-bit PA/SE converter | IC type 74165 |
| 240 | one-shot multivibrator | IC type 74121 |
| 246, 252 | Quad 2 NOR gate | IC type 7402 |
| 248 | D-type edge triggered flip-flop | IC type 7474 |
| 250 | timer | IC type 555 |
| 256, 258 | exclusive NOR gate | IC type 7486 |
| 260, 262 | npn - general purpose transistor | 2N3643 |
| 264 | frequency compensated operational amplifier | IC type 741 |
| 272, 274 | high speed comparator | IC type 710 |
| 277, 278, 280, 282, 284 | Quad 2 NAND gates | IC type 7400 |
| 286, 298 | dual voltage controlled oscillator | IC type MC4024 |
| 288, 292 and 296 | frequency-phase detectors | IC type MC4044 |
| 290 | 4-bit binary counter | IC type 7493 |
| 294 | npn general purpose transistor | 2N3859A |
| 302, 318 | D-type edge triggered flip-flop | IC type 7474 |
| 304, 306, 313, 316 | Dual 4 input NAND gate | IC type 7420 |
| 308, 310, 311, 315 | Quad 2 input NAND gate | IC type 7400 |
| 312 | Divide by 12 counter | IC type 7492 |
| 320, 323 | Dual one-shot retriggerable multivibrator | IC type 74123 |
| 324, 326, 328, 330, 332, 334 | 8-bit SE/PA converters | IC type 74164 |
| 336, 338, 340, 342, 344 | 8-bit odd/even parity generator/checker | IC type 74180 |
| 346, 350 | Dual 4 input NAND gate | IC type 7420 |
| 348 | Quad 2 input NOR gate | IC type 7402 |
| 352, 354 | D-type edge triggered flip-flop | IC type 7474 |
| 356 | One-shot multivibrator | IC type 74121 |
| 358 | 4-bit binary counter | IC type 7493 |
| 360 | npn general purpose transistor | 2N3643 |
| 362 | npn high speed switching | 2N2219 |

-continued

| NUMBER | GENERAL DESCRIPTION | TYPE |
|---|---|---|
| 372, 374 | transistor<br>frequency compensated<br>operational amplifier | IC type 741 |
| 378, 380, 384, 386, 394, 396, 400, 402, 404, 414, 422 | npn general purpose transistors | 2N3859A |
| 406, 416 | npn general purpose transistors | 2N3643 |
| 408, 418, 420 | pnp power amplifier transistors | 2N4036 |
| 424 | npn type power amplifier transistor | 2N3053 |

In operation, when a roll of tape including labels 34 and carrier web 36 has been placed on the hub 102 and threaded through the transport mechanism, the tape is automatically advanced until a label appears at the exit slot 24. Such advancement will stop when two conditions are met: The "tag" sensor 144 must be covered by the label and the "scribe" sensor 146 must be illuminated from light from the light source 142 transmitted through the carrier web. When a label is thereafter removed from the slot 24 by the operator, the light from the lamp 142 illuminates the "tag" sensor 144 and the tape is thereafter advanced until the stop condition is once again met.

While the labels are advancing, the recording head 144 is encoding each label with digital information initiated when the encode circuitry receives the initiation signal on lead 44 from the transistor 184. At the same time, the read head 116 is obtaining information from a previously encoded label and is sending it to the verifier circuit 190. This circuit checks for the proper start word and parity bits. In the event either is not correct, this circuit sends a command signal on lead 76 to the punch drive 192 which unlatches the reject arm and punches a hole in the side of the label. As this occurs, the guide arm 134 moves upward and captures the punched label to prevent it from exiting at the slot 24. When the advancing punched label has illuminated the "scribe" sensor 146, the system stops. However, the punched hole also illuminates the "tag" sensor 144 and the system thus advances one more label. This process is repeated until a limit of 8 defective labels is reached or until a verified (unpunched) label is present. In the event 8 defective labels are sensed, further advancement is prevented and a signal on lead 78 energizes the failure light 18.

In the embodiment thus described, the punched (i.e., non-verified) labels are rewound on the carrier web 36 while the verified labels are presented at the dispensing slot 24 for removal by a machine operator. In any embodiment wherein a single apparatus constructed according to the present invention is intended to be used in conjunction with several dispensing apparatuses not having the record and verify capability, the apparatus may readily be converted such that verified tags are rewound on the carrier web and notched (non-verified) labels are rejected via the dispenser slot 24. The rewound tape containing only verified labels may thus be used in any dispensing apparatus without need for further verification. In a similar embodiment, both verified and non-verified (punched) labels may be rewound on the carrier web such that when the labels are to be applied to the articles, the machine operator must recognize and dispose of the non-verified labels.

Having thus described the present invention, what is claimed is:

1. An apparatus for encoding a magnetic recording medium in the form of labels removably adhered to a carrier web and which upon removal therefrom are to be affixed as labels to articles for subsequent identification thereof, wherein the apparatus comprises
    a. means for transporting said carrier web such that said labels are sequentially moved past a magnetic recording head,
    b. means for energizing said recording head as a given label passes thereby to magnetically encode that label,
    c. means for reading the magnetic encoding and for producing a signal corresponding thereto,
    d. means coupled to said reading means for verifying said signal and for producing an enabling signal indicative thereof,
    e. means for removing said carrier web from said encoded labels, and
    f. means for automatically differently processing said encoded labels in response to the enabling signal.

2. An apparatus according to claim 1, wherein said automatic processing means comprises means for mechanically acting on said encoded labels in response to the enabling signal.

3. An apparatus according to claim 1, wherein said automatic processing means comprises means for marking an encoded label corresponding to an enabling signal and means for separately dispensing so marked and unmarked labels.

4. An apparatus according to claim 1, wherein the automatic processing means includes means for dispensing encoded labels, for sensing the presence of a label at the dispensing means, and for thereupon terminating the transporting of said labels.

5. An apparatus according to claim 4, wherein said labels are carried in a spaced relationship, and wherein said sensing means comprises means for optically sensing the presence of a label at said dispensing means and means for optically sensing the spacing between adjacent labels to terminate said advancement upon the occurrence of signals from both optical sensing means.

6. An apparatus according to claim 4, wherein said automatic processing means comprises means for marking a label upon the occurrence of an enabling signal associated therewith.

7. An apparatus according to claim 4, said marking means comprising means for punching a notch in a label corresponding to the occurrence of an enabling signal.

8. An apparatus according to claim 7, wherein said means for optically sensing a label at said dispensing means is deactivated by the presence of a label having a notch therein such that said transporting continues and rejects a label having a notch therein.

9. An apparatus according to claim 8, said apparatus further comprising means defining a separating edge around which said carrier web is drawn for peeling said carrier web from said labels.

10. An apparatus according to claim 8, further comprising means responsive to said optical sensing means for selectively removing and ejecting labels having a notch therein from the carrier web, and means including a take-up reel for storing labels still on the carrier web.

11. An apparatus according to claim 10, said automatic processing means further comprising means for peeling the labels from said carrier web and means responsive to said optical sensing means for reapplying selected labels to said carrier web and for rewinding said reapplied labels and carrier web onto said take-up reel.

12. An apparatus according to claim 1, wherein said verification means comprises means for checking the start of the magnetic encoding, means for checking the end of the magnetic recording, and means for checking the parity of at least one portion of the magnetic recording.

13. An apparatus according to claim 1, wherein said magnetic recording comprises a start word, a predetermined plurality of data words containing a number of data bits and separated from another word by a parity bit and an end word and wherein said verification means comprises means for verifying the presence of said start word, means for verifying the presence of each parity bit and means for verifying the presence of said end word whereupon a said enabling signal is produced when the presence of a said start word, each parity bit and end word is verified.

14. An apparatus for dispensing a magnetic recording medium in the form of labels removably adhered to a carrier web and which upon removal therefrom are to be affixed to articles for subsequent identification thereof, wherein the apparatus comprises a. means for transporting said carrier web such that said labels are sequentially moved past a magnetic recording head, b. means for energizing said recording head as a given label passes thereby to magnetically encode said given label with unique information indicative of an article to which that label including the recording is to be affixed, c. means for removing said encoded labels from said carrier web and for automatically positioning a first encoded and removed label at a dispensing slot and for automatically positioning another encoded and removed label at said slot upon the removal of said first label therefrom.

15. An apparatus according to claim 14, further comprising e. means for reading the magnetic encoding and for producing a signal corresponding thereto, f. means coupled to said reading means for verifying said signal and for producing an enabling signal indicative thereof, and g. means for automatically differently processing the labels in response to the enabling signal.

16. An apparatus according to claim 14 wherein said labels are carried in a spaced relationship and wherein the means for automatically differently processing the labels includes means for optically sensing the presence of a label at the dispensing means and means for optically sensing the spacing between adjacent labels to terminate said advancement upon the occurrence of signals from both optical sensing means.

17. An apparatus according to claim 16, wherein said automatic processing means comprises means for marking the label upon the occurrence of an enabling signal associated therewith and wherein said means for optically sensing a label at said dispensing means is deactivated by the presence of a said marked label such that said transporting continues and rejects said marked labels from the dispenser slot.

* * * * *

UNITED STATES PATENT AND TRADEMARK OFFICE
CERTIFICATE OF CORRECTION

PATENT NO. : 4,027,141
DATED : May 31, 1977
INVENTOR(S) : Richard F. Dubbe and Richard D. Ebbinga It is certified that error appears in the above-identified patent and that said Letters Patent are hereby corrected as shown below:

Column 10, line 24, change "408" to -- 418 --, and line 27, change "422" to -- 424 --.

Signed and Sealed this twenty-third Day of August 1977

[SEAL]

Attest:

RUTH C. MASON
*Attesting Officer*

C. MARSHALL DANN
*Commissioner of Patents and Trademarks*